(12) United States Patent
Yamamoto

(10) Patent No.: US 6,435,015 B1
(45) Date of Patent: Aug. 20, 2002

(54) SCANNING PROBE MICROSCOPE

(75) Inventor: Hiroyoshi Yamamoto, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/526,163

(22) Filed: Mar. 15, 2000

(30) Foreign Application Priority Data

| Mar. 17, 1999 | (JP) | ............................................ 11-072214 |
| Oct. 22, 1999 | (JP) | ............................................ 11-300369 |
| Feb. 28, 2000 | (JP) | ........................................ 2000-051458 |

(51) Int. Cl.[7] ............................. G01B 5/28; G01B 7/34; G01N 13/16
(52) U.S. Cl. ........................ 73/105; 73/866.5; 250/306
(58) Field of Search ............................... 73/105, 866.5; 250/306, 307

(56) References Cited

U.S. PATENT DOCUMENTS

| 5,157,251 A | * | 10/1992 | Albrecht et al. | ............ 250/307 |
| 5,253,515 A | * | 10/1993 | Tod et al. | ...................... 73/105 |
| 5,376,790 A | * | 12/1994 | Linker et al. | ................ 250/306 |
| 5,423,514 A | * | 6/1995 | Wakiyama et al. | ............ 73/105 |
| 5,705,814 A | * | 1/1998 | Young et al. | ................ 250/306 |
| 5,874,669 A | * | 2/1999 | Ray | ............................ 73/105 |
| 6,138,503 A | * | 10/2000 | Ray | ............................ 73/105 |

* cited by examiner

Primary Examiner—Daniel S. Larkin
(74) Attorney, Agent, or Firm—Adams & Wilks

(57) ABSTRACT

A scanning probe microscope having a cantilever probe is provided with a probe supply mechanism for supplying cantilever probes to a probe attaching portion of the microscope. The cantilever probes are held by the probe supply mechanism by an elastic material. The microscope has a controller for performing a cantilever attaching operation by causing the cantilever attaching portion to come into contact with a cantilever probe held by the probe supply mechanism and to further approach the cantilever attaching portion to compress the elastic material so that the cantilever probe becomes firmly attached to the cantilever attaching portion.

25 Claims, 3 Drawing Sheets

SCANNING PROBE MICROSCOPE

BACKGROUND OF THE INVENTION

This invention relates to a scanning probe microscope.

Atomic force microscopes (AFM) have been studied and are expected to serve as novel surface topological observing means since devised by an inventor of the STM, G. Binnig et al. (Physical Review Letters vol. 56 p930 1986). The underlying principle is that an interatomic force acting between a detection tip fully sharpened at a tip and a sample is measured as a displacement of a cantilever to which the detection tip is mounted. A sample surface is scanned while maintaining the displacement between the sample surface and the cantilever constant so that the sample surface is measured in topology using as topological information a control signal applied to maintain the displacement in the cantilever. In recent years, besides atomic force, the application field has broadened to measure various physical characteristics such as magnetic force and surface potential force. Such instruments are generally referred to as scanning probe microscopes.

The cantilever in a scanning probe microscope is fabricated by a semiconductor manufacturing process and has a size of approximately 0.3–10.5 mm in thickness, 1.3–1.6 mm in width and 3 mm in length. Of the scanning probe microscopes currently being produced, there are many scanning probe microscopes having an intermediate part referred to as a lever holder or the like so that the cantilever attached to the lever holder is thereafter mounted onto the probe microscope main body. However, because the presence of an intermediate part such as the lever holder is disadvantageous in automation, there is a scheme in which the cantilever is directly attached to a cantilever attaching portion at a tip of a fine movement mechanism rather than through the use of a lever holder. For cantilever fixing in such a case, the vacuum suction scheme is adopted in view of miniaturization, automation, and the like.

FIG. 4 is a side sectional view of a conventional cantilever supply mechanism. FIG. 5 is a top view of the conventional cantilever supply mechanism. Conventionally, the cantilever supply mechanism for supplying a cantilever to the cantilever attaching portion has been formed of a metal block having the same angle as the slant angle of the cantilever attaching portion and mountable with a plurality of cantilevers arranged. The individual cantilever 1 is set up in a positioning groove by tweezers or the like.

The positional coordinates of respective cantilevers 1 are stored in a controller. The area where the cantilevers are to be mounted is slanted but structured such that the cantilever 1 is prevented from falling out by an anti-slip stopper portion 40. In the case the cantilever 1 is desired to be fixed more positively, a pipe port 41 may be connected with a vacuum section source and suction-fixing may be used.

In the cantilever attaching procedure, first an XY stage is moved to a stored coordinate and moved immediately above a cantilever to be replaced in a cantilever attaching portion. Next, a Z stage is moved to approach the cantilever attaching portion and the cantilever to a distance at which the cantilever can be vacuum-attached. In an apparatus trial-manufactured, the distance was generally 0.5 mm or less. Finally, the vacuum suction source is actuated to attach the cantilever onto the cantilever attaching portion, thus ending attaching operation.

However, there are the following problems in the cantilever attaching operation performed by the conventional cantilever supply mechanism.

(1) Because the vacuum suction source is actuated in a state where the cantilever attaching portion and the cantilever are not yet in close contact, when the cantilever is attracted by the cantilever attaching portion, the dust floating around the areas is also attracted. The dust is caught between the cantilever and the cantilever attaching portion, possibly causing instability.

(2) Vacuum suction is made in a state where the cantilever attaching portion and the cantilever are not yet closely contacted, the cantilever is attracted while it is horizontally or rotationally deviated and jumps up to the cantilever attaching portion, resulting in poor reproducibility in cantilever attaching position.

Therefore, it is an object of this invention to obtain a novel cantilever supply mechanism and a method of attaching the cantilever in order to solve such conventional problems

SUMMARY OF THE INVENTION

In order to solve the above problems, in the present invention a cantilever holding portion of a cantilever holding mechanism of a cantilever supply mechanism is structured by a base, cantilever fixing means disposed on the base, and an elastically deformable material, or a material having elasticity disposed on the base. When the cantilever is to be attached to the cantilever attaching portion, the Z stage is moved until the cantilever attaching portion comes into contact with the cantilever and is further moved a predetermined quantity after such contact.

In the cantilever supply mechanism structured as described above, when a cantilever is attached, the Z stage is operated to bring into contact the cantilever attaching portion with the cantilever. After contact, the Z stage is further operated whereby the cantilever attaching portion can be brought into complete contact with the cantilever. The physical interference in operation after such contact is absorbed by elastic deformation in the elastic material which is preferably an adhesive and a pressure sensitive conductive elastomer. By vacuum attaching the cantilever in a state of full and close contact, this solves the problem of attracting dust and the problem of positional deviation of the cantilever upon attachment.

DETAILED DESCRIPTION OF THE INVENTION

Figure 1:
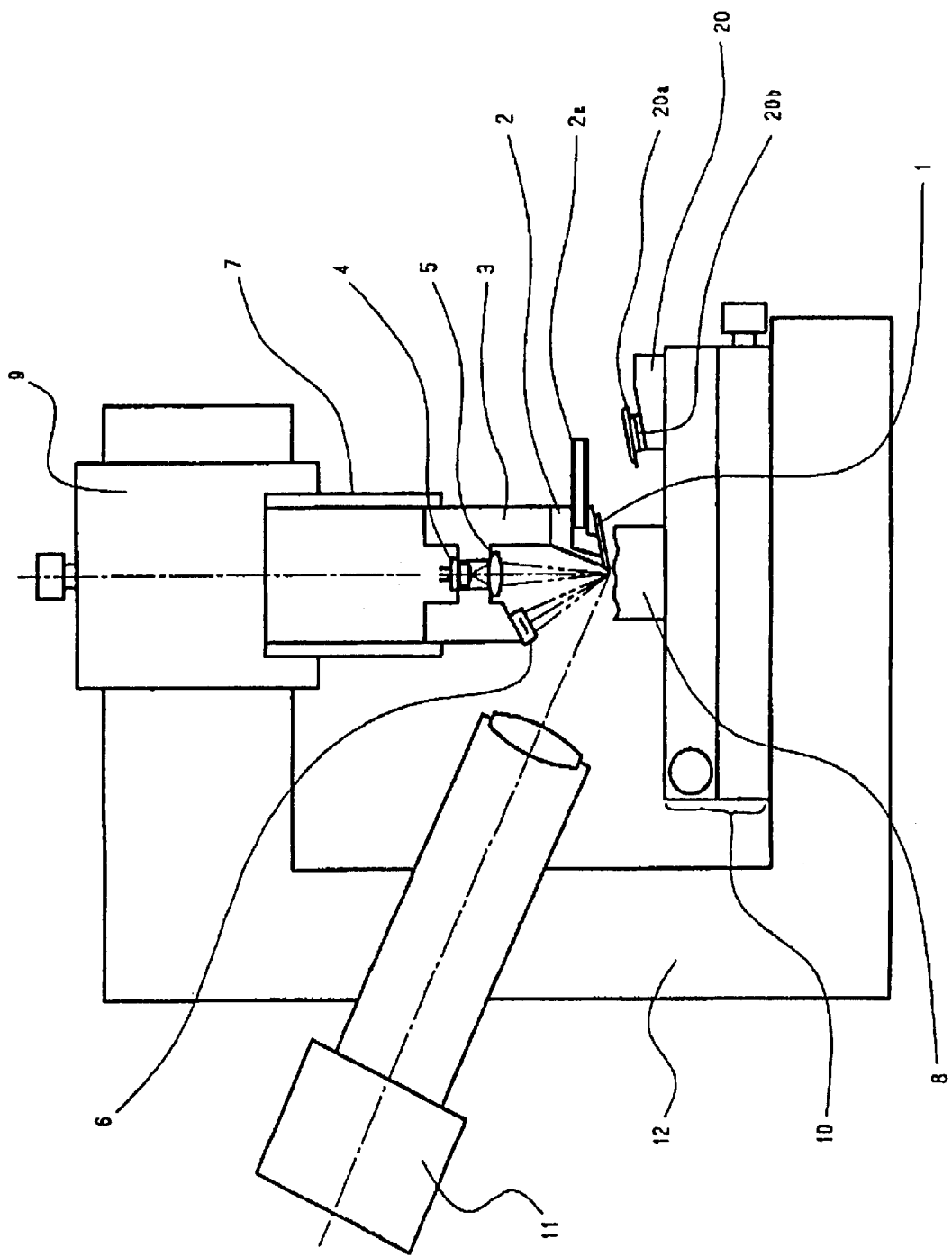
FIG. 1 is a structural view of an embodiment of a scanning probe microscope according to the present invention.

A scanning probe microscope of the present invention measures force acting on a probe and s sample as displacement of a cantilever to which the probe is attached, scans a sample surface while keeping displacement of the cantilever constant with a fine movement mechanism, and measures characteristics of the sample surface. The scanning probe microscope comprises a Z stage for causing the cantilever to approach the sample, an XY stage for positioning the cantilever to an arbitrary position within a sample plane, and a cantilever attaching portion attached to an end portion of the fine movement mechanism to hold the cantilever by vacuum section power, an optical microscope for observing the cantilever and the sample, and a cantilever supply mechanism for holding a plurality of cantilevers to supply the cantilever to the cantilever attaching portion by positioning in the XY stage and approach-moving of the cantilever supply mechanism.

A scanning probe microscope in accordance with another aspect of the present invention comprises a cantilever having a probe at a tip thereof, displaced by force acting between the probe and a sample surface, displacement detection means comprised of an optical lever formed by a semiconductor laser, a lens, and a photodetector element to illuminate laser light light on the cantilever so that a positional deviation in reflection light is detected as a displacement of the cantilever by the photodetector element, a cantilever attaching portion for holding the cantilever by a vacuum suction force, a fine movement mechanism having the cantilever attaching portion disposed on a tip thereof to scan the sample surface while controlling the cantilever to be held at a constant distance from the sample, a Z stage for causing the cantilever to an arbitrary position within a sample plane, an optical microscope of observing the cantilever and the sample, a controller for controlling the entire apparatus, and a cantilever supply mechanism for holding a plurality of cantilevers and positioned by the XY stage to supply the cantilevers to the cantilever attaching portion.

A cantilever holding portion of the cantilever supply mechanism is preferably constructed by a cantilever fixing means and a material having elasticity.

The cantilever fixing means may be a material having adhesiveness or a vacuum suction mechanism.

High polymer material having elasticity or metal material, for example, is preferably used for the material having elasticity.

When a cantilever at a holding portion in the cantilever supply mechanism is pressed against a cantilever attaching portion using an elastomer having a pressure sensitive conductivity for the high polymer material having elasticity, the elastic displacement amount of the elastomer having a pressure sensitive conductivity can be detected by monitoring the resistance value thereof. Accordingly, the cantilever is not pressed beyond necessity.

A cantilever holding portion of the cantilever supply mechanism may be constructed by an elastic material having adhesiveness. Silicon gel, for example, is preferably used for the elastic material having adhesiveness so as to utilize the adhesiveness and elasticity thereof. Elastomers having adhesiveness and a pressure sensitive conductivity simultaneously may be used for the elastic material having adhesiveness.

Hereunder, an embodiment of this invention will be explained based on the drawings.

FIG. 1 is an embodied example of a scanning probe microscope of the present invention.

In FIG. 1, a displacement detection system and a cantilever attaching portion 2 are made in one body, forming an optical head 3. The displacement detection system is comprises of a semiconductor laser 4, a lens 5, and a photodetector element 6. The cantilever attaching portion 2 is arranged at a tip of the optical head 3. The cantilever 1 is attached to the cantilever attaching portion 2 by vacuum suction. The cantilever attaching portion at a piping port 2a is connected with a tube (not shown) and coupled to a vacuum pump. The laser light emitted from a semiconductor laser 4 is focused on a tip of the cantilever 1 by a lens 5, whose reflection light is illuminated to the photodetector element 6. The optical head 3 is mounted at the tip of a fine movement mechanism 7. By the fine movement mechanism 7 the cantilever 1 is scanned in an in-plane direction of the sample while being controlled in a height direction with respect to a sample 8. An optical microscope 11 is provided in order to observe a sample 8 surface state and positional alignment between the cantilever 1 and the sample 8. The fine movement mechanism 7 is arranged on a Z stage 9, and the cantilever 1 is fed to a contact position with the sample 8 by the Z stage 9. The sample 8 is placed on an XY stage 10. The XY stage 10 is actuated while observing a positional relationship between the cantilever 1 and the sample 8 by an optical microscope 11, thereby enabling measurement on an arbitrary position of the sample 8.

A cantilever supply mechanism 20 is arranged at one corner of the XY stage 10. On a base of the cantilever supply mechanism 20 are formed an elastic material 20a having adhesiveness and an elastomer layer 20b having pressure sensitive conductivity, forming a cantilever holding portion. The cantilever 1 is held on the adhesive elastic material 20a by an adhesion force.

Figure 2C:
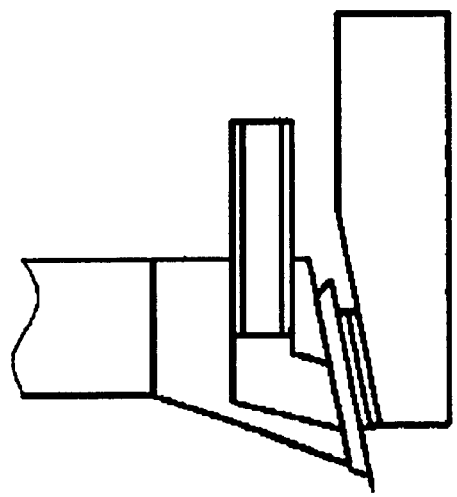
FIGS. 2A, 2B, and 2C are explanatory views showing a procedure of a cantilever attaching operation according to the invention.
Figure 2B:
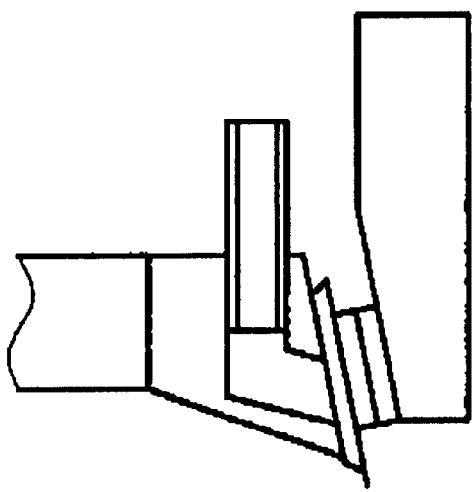
Figure 2A:
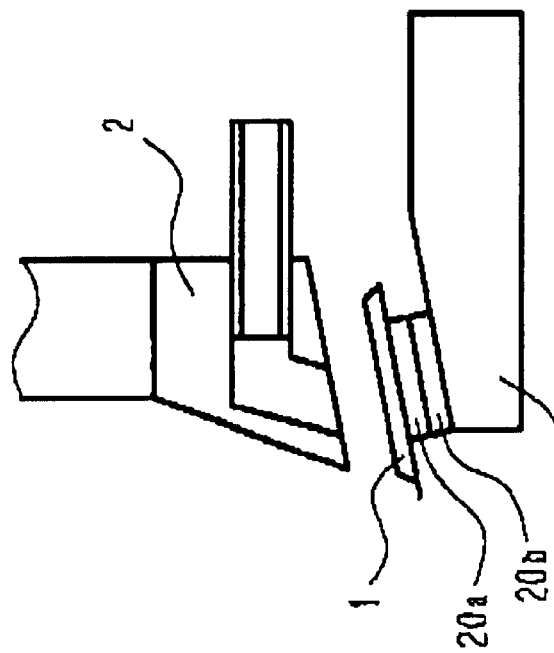

FIGS. 2A, 2B, and 2C show a flow of the cantilever attaching operation. A series of operations are conducted under monitoring with the optical microscope. First, the cantilever supply mechanism 20 is moved to immediately below the cantilever attaching portion 2 by the XY stage, and the cantilever attaching portion 2 is approached to a vicinity of a cantilever holding portion of the cantilever supply mechanism 20 (FIG. 2A). The cantilever holding portion of the cantilever supply mechanism 20 is oriented at the same angle as an inclination angle of the cantilever attaching portion 2. Next, the Z stage is descended to bring the cantilever attaching portion 2 into contact with the cantilever 1 (FIG. 2B). The determination of whether they are in contact or not can be judged by observation with the optical microscope. Further, the Z stage is lowered by a predetermined amount to bring the cantilever attaching portion 2 and the cantilever 1 into complete close contact (FIG. 2C). The displacement amount pressed in after contact is absorbed as elastic deformation in the adhesive elastic material 20a and pressure sensitive elastomer 20b. After complete contact of the cantilever attaching portion 2 with the cantilever 1, a vacuum suction source is operated for suction-fixing. Finally, the Z stage is ascended, and the cantilever attaching operation completes.

The adhesive elastic material 20a cannot have an adhesion force that is stronger than the vacuum suction force of the cantilever attaching portion 2. Otherwise, when the Z stage is finally ascended in the above procedure, the cantilever 1 would be left at the cantilever holding portion. The size of a vacuum suction hole is limited by the size of the cantilever, therefore the adhesion force must be limited. In the cantilever of 1.3 mm in width and 3 mm in length, the limit of the adhesion force is about 10 g and the adhesive force of the adhesive elastic material 20a must be less than 10 g. As a result of trial manufacture, silicon gel exhibited a favorable adhesion force. It does not constitute a departure from the spirit and scope of the invention to use a material applied with an adhesive instead of a material having adhesiveness as quality of the material itself for the adhesive material.

The sensitive conductive elastomer 20b is arranged with wiring and monitored in electric resistance value by a controller. When lowered below a predetermined resistance value due to an increase in elastic deformation amount, it acts as a safety mechanism against crush breakdown by automatically shutting down the Z stage.

Figure 3:
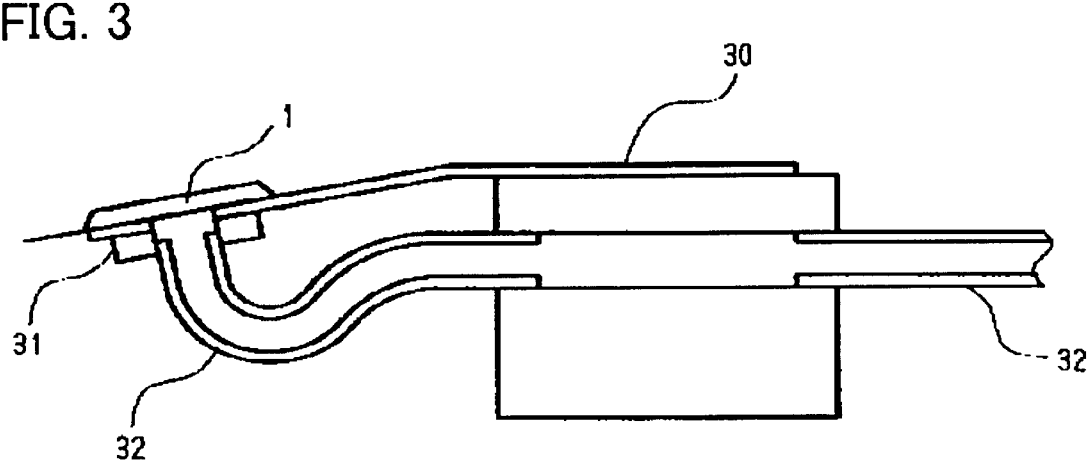
FIG. 3 is a structural view of a second embodiment of a cantilever supply mechanism according to the present invention.
Figure 4:
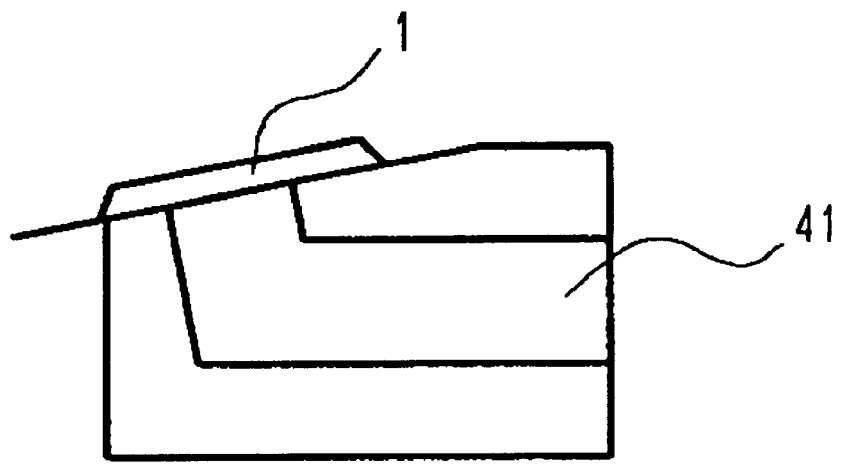
FIG. 4 is a side sectional view of a conventional cantilever supply mechanism.
Figure 5:
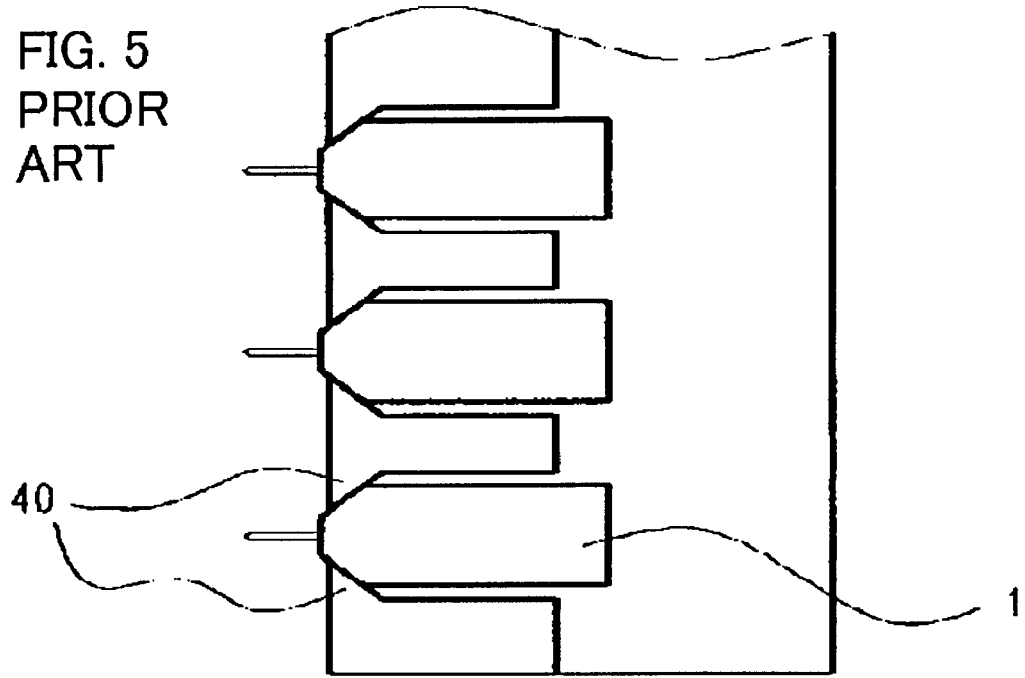
FIG. 5 is a top view of the conventional cantilever supply mechanism.

FIG. 3 is a second embodiment of the present invention. A cantilever holding portion consists of a plate spring 30 and a piping port 31, and in the piping port 31, a tube 32 is piped. Soft material, such as silicon and so on, is used for the tube 32. At the end of the tube 32, a vacuum pump (not shown) is connected, and a cantilever 1 is fixed by vacuum suction force. When the Z stage is pushed a predetermined quantity, elastic transformation function is realized by transformation of the plate spring 30. A safe mechanism against crush destruction is made by applying a sensor like a strain gauge and so on to the plate spring 30 or measuring bend of the plate spring 30 using a displacement gauge of an optical type or the like. The plate spring is made of a material that is usually used for fabricating a spring, such as metal, resin, and so on. The shape of the spring is easily realized not only by plate shape but also by coil spring.

In this invention, as explained above, the cantilever holding portion of the cantilever supply mechanism is structured by the cantilever fixing means and the material having elasticity whereby the cantilever attaching portion can be brought into complete close contact with the cantilever when attaching a cantilever. Due to this, it becomes possible to avoid the phenomenon that dust floating around is sucked upon vacuum suction as in the conventional device.

Also, by vacuum-sucking the cantilever in a state that the cantilever attaching portion and the cantilever are in full and close contact, the problem of position deviating the cantilever upon attachment is solved.

Further, by monitoring the electric resistance of the pressure sensitive elastomer, the possibility could be reduced that the cantilever, fine movement mechanism or the like be damaged due to erroneous operation of the stage or human error.

What is claimed is:

1. A scanning probe microscope comprising:
    a cantilever having a probe at a tip thereof and being displaceable by a force acting between the probe and a sample surface;
    displacement detection means of an optical lever type, comprising a semiconductor laser, a lens, and a photodetector element, for illuminating laser light onto the cantilever and detecting the laser light reflected by the cantilever so that deflection of the cantilever may be detected as a positional deviation in reflected light by the photodetector element;
    a cantilever attaching portion for holding the cantilever by a vacuum suction force;
    a fine movement mechanism having the cantilever attaching portion attached at a tip thereof to scan the sample surface while controlling the cantilever to be maintained a constant distance from the sample;
    a Z stage for causing the cantilever to approach the sample;
    an XY stage for positioning the cantilever at an arbitrary position within a plane of the sample;
    an optical microscope for observing the cantilever and the sample;
    a controller for controlling portions of the scanning probe microscope; and
    a cantilever supply mechanism having a base and an elastically deformable member disposed on the base for holding a supply of cantilevers, the cantilever supply mechanism being positionable by the XY stage to supply a cantilever to the cantilever attaching portion, the elastically deformable member being interposed between the base and a cantilever to be supplied to absorb a force produced when the cantilever attaching portion is brought into contact with the cantilever to be supplied to that full contact between the cantilever attaching portion and the cantilever can be achieved.

2. A scanning probe microscope according to claim 1; wherein the cantilever supply mechanism further comprises cantilever fixing means for fixing the cantilever in a given position on the cantilever supply mechanism.

3. A scanning probe microscope according to claim 2; wherein the cantilever fixing means comprises an adhesive material.

4. A scanning probe microscope according to claim 3; wherein the adhesive material comprises one of a polymer material having elasticity or a metal material having an adhesive.

5. A scanning probe microscope according to claim 4; wherein the adhesive material comprises a polymer elastomer material having elasticity and having a pressure sensitive conductivity.

6. A scanning probe microscope according to claim 5; further comprising means for detecting the resistance of the elastomer having the pressure sensitive conductivity; and wherein the controller performs a cantilever attaching operation by controlling the Z stage to cause the cantilever attaching portion to come into contact with a cantilever held by the cantilever supply mechanism and to further approach the cantilever attaching portion to compress the material having elasticity until the resistance of the elastomer reaches a predetermined value, so that the cantilever becomes firmly attached to the cantilever attaching portion.

7. A scanning probe microscope according to claim 2; wherein the cantilever fixing means comprises a vacuum suction mechanism.

8. A scanning probe microscope according to claim 1; wherein the cantilever supply mechanism has a cantilever holding portion formed of an elastic material having adhesiveness.

9. A scanning probe microscope according to claim 8; wherein the elastic material having adhesiveness is silicon gel.

10. A scanning probe microscope according to claim 8; wherein the elastic material having adhesiveness comprises an elastomer having adhesiveness and a pressure sensitive conductivity.

11. A method of attaching a cantilever to the cantilever attaching portion of the scanning probe microscope according to claim 1; comprising the steps of
    moving the cantilever holding portion to a position directly under the cantilever attaching portion using the XY stage;
    moving the Z stage until the cantilever attaching portion touches a cantilever held by the cantilever holding portion; and
    moving the Z stage an additional predetermined quantity after the cantilever attaching portion touches the cantilever to compress the elastically deformable member so that the cantilever becomes firmly attached to the cantilever attaching portion.

12. A scanning probe microscope according to claim 1; wherein the elastically deformable member comprises a spring.

13. A scanning probe microscope for measuring a force acting on a probe and a sample as a displacement of a cantilever to which the probe is attached, scanning the probe across a sample surface while keeping displacement between the sample surface and the probe constant using a fine movement mechanism, and measuring a physical characteristic of the sample surface, comprising:

a Z stage for casing the cantilever to approach the sample;

an XY stage for positioning the cantilever at an arbitrary position within a plane of the sample; and a cantilever attaching portion attached to the fine movement mechanism to hold the cantilever by vacuum suction power;

an optical microscope for observing the cantilever and the sample;

a cantilever supply mechanism for holding one or more cantilevers to supply a cantilever to the cantilever attaching portion when the cantilever attaching portion is positioned thereover using the XY stage and brought into contact therewith using the Z stage, and having a cantilever holding portion provided with an elastically deformable member for holding the one or more cantilevers, the elastically deformable member being deformed when the cantilever attaching portion is brought into contact with a cantilever to be attached thereto.

14. A scanning probe microscope according to claim 1: wherein the controller performs a cantilever attaching operation by controlling the Z stage to cause the cantilever attaching portion to come into contact with a cantilever held by the cantilever supply mechanism and to further approach the cantilever attaching portion to compress the elastically deformable member so that the cantilever becomes firmly attached to the cantilever attaching portion.

15. A scanning probe microscope according to claim 1; wherein the cantilever supply mechanism holds the supply of cantilevers at a given angle of orientation, and the cantilever attaching portion is oriented at the same angle.

16. A scanning probe microscope according to claim 11; wherein the elastically deformable member comprises a spring.

17. A scanning probe microscope comprising: a cantilever probe; a probe displacement detecting mechanism for detecting displacement of the cantilever probe in response to a force between the probe and a sample surface; a cantilever probe attaching portion on which the cantilever probe is mounted; a fine movement mechanism for causing the probe to undergo relative scanning movement with respect to the sample surface and to maintain a constant distance between the probe and the sample surface; a rough movement mechanism for causing relative movement between the probe and the sample; and a probe supply mechanism for supplying cantilever probes to the cantilever probe attaching portion and having a base and an elastic material disposed on the base for holding one or more probes, the elastic material being elastically deformed when the cantilever probe attaching portion is brought into contact with a probe to be attached thereto.

18. A scanning probe microscope according to claim 17, further comprising a controller for performing a cantilever probe attaching operation by controlling the rough movement mechanism to cause the cantilever probe attaching portion to come into contact with a cantilever probe held by the probe supply mechanism and to further approach the cantilever probe attaching portion to compress the elastic material so that the cantilever probe becomes firmly attached to the cantilever probe attaching portion.

19. A scanning probe microscope according to claim 18; wherein the probe supply mechanism further comprises a vacuum suction mechanism for holding the cantilever probes.

20. A scanning probe microscope according to claim 19; wherein the adhesive material comprises an elastomer having a pressure sensitive conductivity.

21. A scanning probe microscope according to claim 20; further comprising means for detecting the resistance of the elastomer having the pressure sensitive conductivity; and a controller for performing a cantilever probe attaching operation by controlling the rough movement mechanism to cause the cantilever probe attaching portion to come into contact with a cantilever probe held by the probe supply mechanism and to further approach the cantilever probe attaching portion to compress the elastomer until the resistance of the elastomer reaches a predetermined value, so that the cantilever probe becomes firmly attached to the cantilever attaching portion.

22. A scanning probe microscope according to claim 18; wherein the probe supply mechanism further comprises an adhesive material.

23. A scanning probe microscope according to claim 22; wherein the adhesive material comprises one of a polymer material having elasticity and a metal material having an adhesive thereon.

24. A scanning probe microscope according to claim 22; wherein the adhesive material comprises a polymer material having elasticity.

25. A scanning probe microscope according to claim 17; wherein the elastic material comprises a spring.

* * * * *